2,809,308

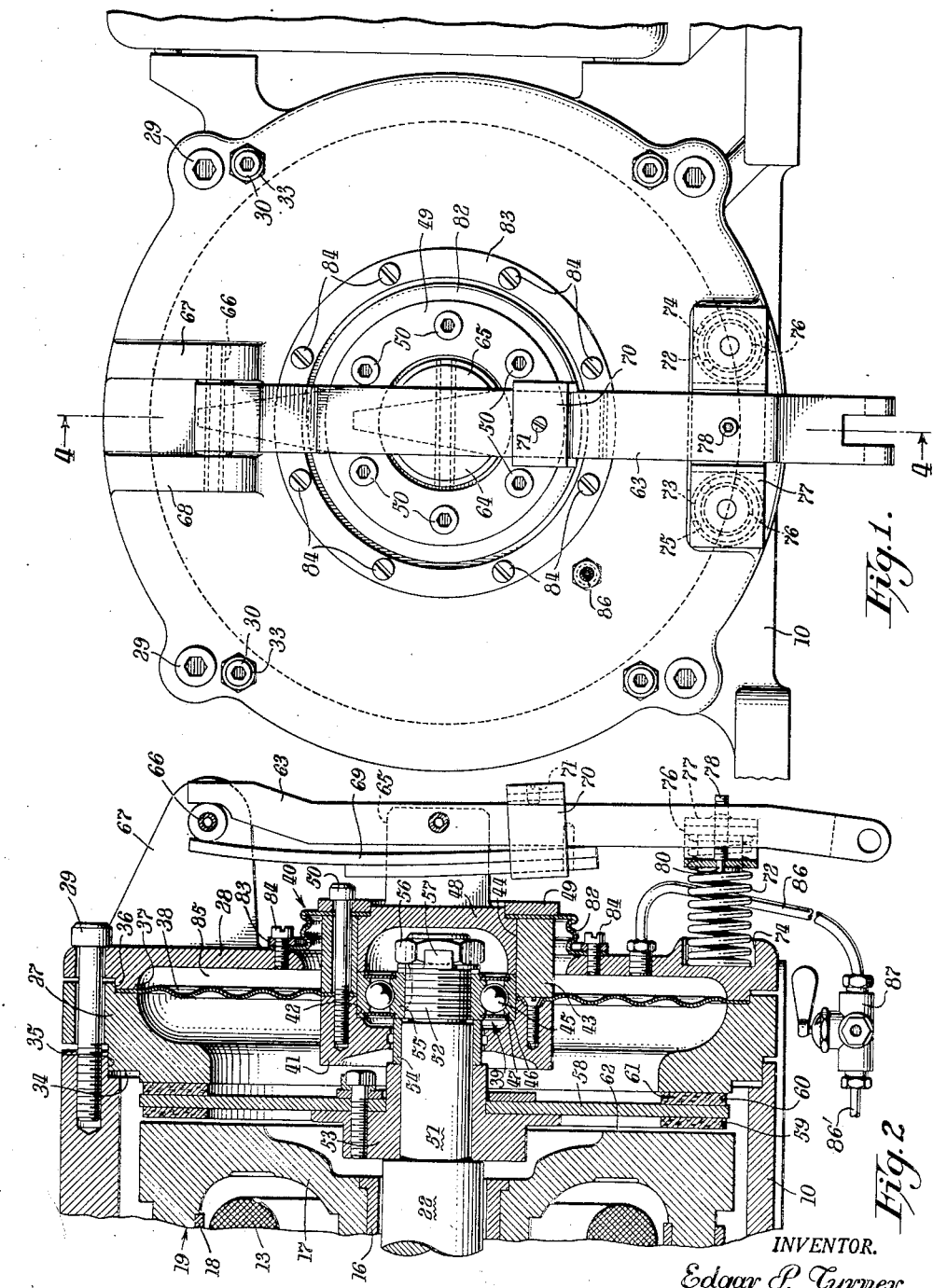

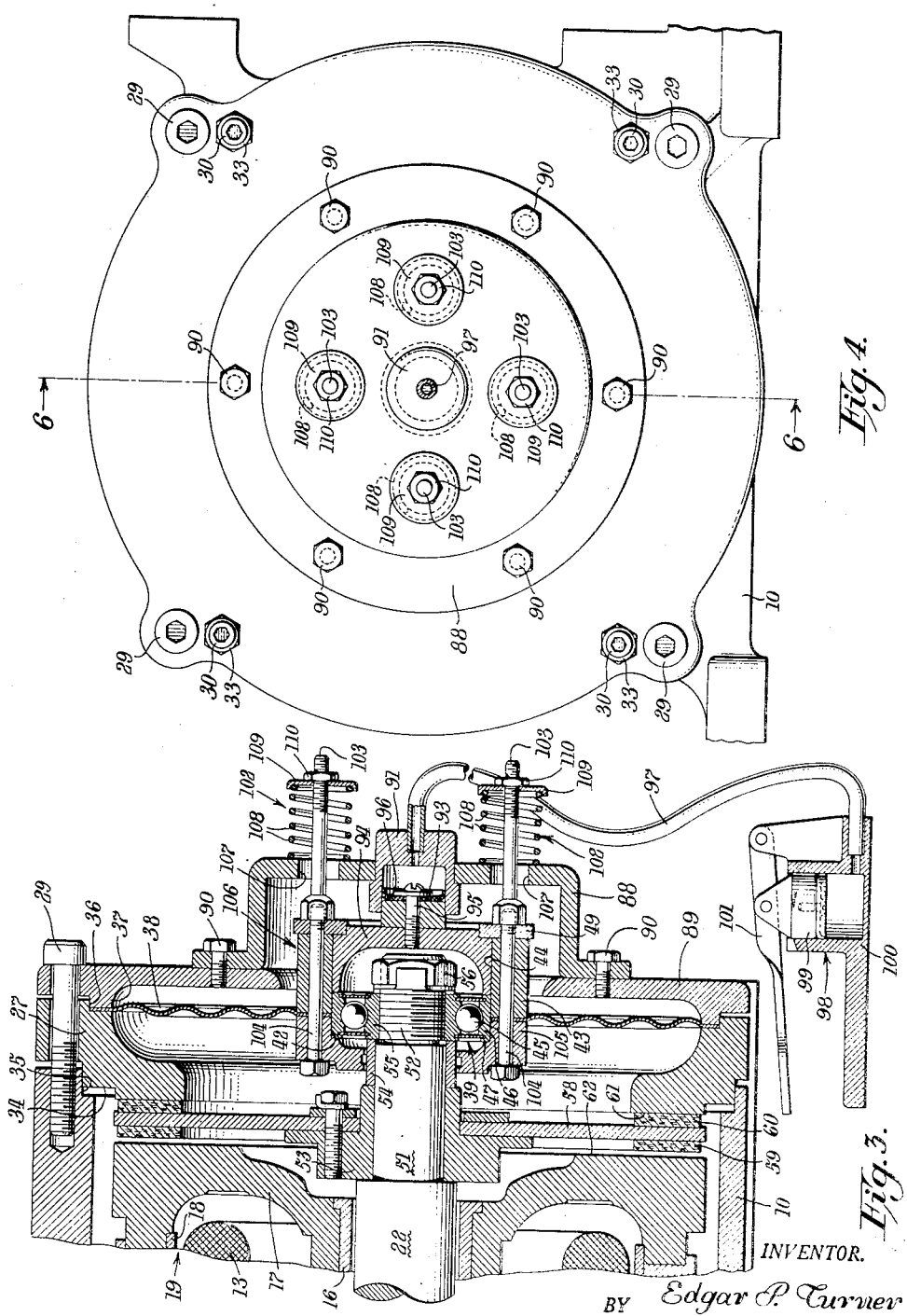

ACTUATING MECHANISMS FOR ELECTRIC CLUTCH-BRAKE MOTORS

Edgar P. Turner, Watchung, N. J., assignor to The Singer Manufacturing Company, Elizabeth, N. J., a corporation of New Jersey Original application December 12, 1952, Serial No. 325,583, now Patent No. 2,717,967, dated September 13, 1955. Divided and this application June 13, 1955, Serial No. 515,123

5 Claims. (Cl. 310—76)

This invention relates to electric clutch-brake motors or power transmitters connected to a heavy load which must be repeatedly started and stopped and this application is a division of my copending application No. 325,583, filed December 12, 1952, now U. S. Patent No. 2,717,967, dated September 13, 1955. The invention relates more particularly to heavy duty clutch-brake motors provided with an axially movable driven shaft wherein at least one end of the shaft is mounted in an axially movable control bearing.

An object of the invention is to provide a fluid pressure operated actuating device for the clutch and brake mechanism.

Fig. 1 is an end view in elevation of a clutch-brake motor including one embodiment of my invention.

Fig. 2 is a partial sectional view of the motor shown in Fig. 1 taken substantially on line 4—4 of Fig. 1.

Fig. 3 is a vertical end view partly in section of a clutch-brake motor including a second embodiment of my invention.

Fig. 4 is a partial sectional view taken substantially on line 6—6 of Fig. 3.

Referring more specifically to the drawings, the first embodiment of the invention as shown in Figs. 1 and 2 is incorporated in a clutch-brake motor constructed in accordance with my above identified patent and comprises a frame or casing 10 in which is carried a motor stator 13 and a rotatably supported sleeve shaft 16 which is rigidly secured to a motor rotor 17 having a cylindrical portion 18 concentric with the stator 13. This structure forms a complete motor assembly 19. An axially movable and rotatable drive shaft 22 extends through the sleeve 16 and is journaled at its left end in a roller bearing (not shown) carried by the casing 10. Since the present invention relates to the clutch and brake mechanism and the device for moving the driven shaft 22 axially, it is not believed that a further description of the overall structure of the clutch-brake motor is necessary. For a more detailed description reference may be made to my above identified U. S. Patent No. 2,717,967.

The right hand end of the casing 10, as viewed in Fig. 2, carries a brake ring 27 and a protective cover or backing ring 28. Four screws 29 extend through clearance holes in the brake ring 27 and the backing ring 28 and are threaded into the casing 10 to hold the brake ring and backing ring firmly in place on the end of the casing 10. Four brake adjusting screws 30 are equally spaced around the backing ring 28 and pass through clearance holes in the backing ring 28. The screws 30 are threaded through threaded holes in the brake ring 27 to engage the end surface of the casing 10. Lock nuts 33 hold the screws 30 in their adjusted positions. The brake ring 27 is provided with a pilot portion 34 which enters a counterbore 35 in the end of the casing 10 to maintain the brake ring 27 concentric with the casing 10. A counterbore 36 is formed in the outer face of the brake ring 27 and receives an annular lip 37 formed on the backing ring 28. A flexible diaphragm 38 has its outer edge positioned in the counterbore 36 and is securely clamped in place by the lip 37 on the backing ring 28. The diaphragm may be made from any relatively thin sheet material, such as steel or copper and is corrugated, as shown in the drawings, to provide greater flexibility. A circular center opening is provided in the diaphragm substantially concentric with the corrugations to permit an anti-friction bearing 39 to be placed concentric with the corrugations.

A control bearing assembly for moving the shaft 22 axially comprises a bearing holder cup assembly 40 fastened to the bearing 39 and the center portion of the diaphragm 38. The cup assembly 40 comprises a base portion 41 having a bearing receiving bore 42; the base portion 41 being securely fastened to one side of the diaphragm 38. A guide and clamping ring 43 is positioned against the other side of the diaphragm 38 and is provided with a center bore 44 which is coaxial with and of the same diameter as the bore 42 in the base portion 41. The ball bearing 39 is provided with rolling elements 45 positioned in the bores 42 and 44 and has an outer race 46 seated against a shoulder 47 in the base portion 41. The bore 44 in the ring 43 receives a control cap 48 which is held against the outer race 46 of the bearing 39 by a retainer ring 49. Long screws 50 pass through the retainer ring 49, clamping ring 43 and diaphragm 38 and are threaded into the base portion 41 to hold the cup assembly 40 tightly together. This construction holds the bearing 39 securely positioned with respect to the diaphragm 38. Further, it should be noted that a plane passing through the edge of the central opening in the diaphragm 38 also passes through the center of each of the rolling elements 45 of the bearing 39. The driven shaft 22 is provided with a reduced diameter portion 51 and a threaded portion 52 on its right end, as viewed in Fig. 2. A hub 53 and spacing sleeve 54 are positioned on the shaft portion 51. The bearing 39 is provided with an inner race 55 which is positioned on the threaded portion 52 of the shaft 22 and held firmly against the sleeve 54 by a nut 56 and lockwasher 57. Thus, the bearing 39 and the holder cup assembly 40 cannot move axially relative to the shaft 22. A disc 58 is fastened to the hub 53 and carries a clutch facing 59 on one side and a brake facing 60 on the other side. The brake facing 60 is engageable with a stationary brake surface 61 on the brake ring 27 and the clutch facing 59 is engageable with a clutch surface 62 on the rotor 17.

The driven shaft 22 can be moved axially by means of an actuating mechanism disposed at the right end of the motor as viewed in Fig. 2. The control or actuating mechanism comprises a lever 63 which is pivotally fastened to two ears 64 and 65 formed on the control cap 48. One end of the lever engages a pin 66 carried by two bosses 67 and 68 formed on the backing ring 28. A leaf type spring 69 has one end secured to the lever 63 by a clamp 70 and screw 71 and the other end of the spring engages the pin 66 approximately diametrically opposite to the end of the lever 63. Two brake springs 72 and 73 are seated in sockets 74 and 75, respectively, formed in the backing ring 28 and engage pilot studs 76 fastened to a cross member 77. The cross-member 77 and springs 72 and 73 are located with one spring engaging the cross-member on each side of the lever 63. An adjusting screw 78 passes through a threaded hole 79 in the lever 63 and has a pilot end portion 80 engaging the cross-member 77. The pilot studs 76 and the pilot end portion 80 of the brake spring adjusting screw 78 hold the springs 72 and 73 in their correct positions with respect to the lever 63.

The embodiment shown in Figs. 1 and 2 is provided with a fluid control device to control the engagement of the clutch and brake. A bellows 82 of the Sylphon type has one end clamped between the clamping ring 43 and the retainer ring 49 and the other end clamped to the backing ring 28 by a clamping ring 83 and screws 84. The space 85 between the diaphragm 38 and the backing ring 28 forms a fluid tight chamber into which fluid under pressure can be introduced and exhausted, through tubes 86 and 86' and a control valve 87. The tube 86' can be connected to any suitable source of fluid under pressure (not shown).

In operation, when the valve 87 is set to admit fluid under pressure into the chamber 85, the force of the fluid causes the diaphragm 28 to flex toward the left as viewed in Fig. 2, moving the shaft 22 also to the left until the clutch facing 59 engages the clutch surface 62. Of course, the movement of the shaft 22 to the left causes a corresponding movement of the bearing support cup assembly 40 drawing the lever 63 against the force of the springs 72 and 73. When the valve 87 is moved to cut off the fluid pressure supply and exhaust the chamber 85, the compressed springs 72 and 73 move the lever 63 and the driven shaft 22 to engage the brake facing 60 with the brake surface 61. It is understood that any suitable valve device can be used for the valve 87. It should be noted that the seal 82 is sufficiently flexible to permit the bearing 39 to align itself by flexing the diaphragm 38, if necessary, with a minimum of resistance being offered by the seal 82.

Of course, it will be apparent that with minor valve changes, the tube 86 can be alternately connected to a source of fluid pressure and a vacuum, whereby the clutch is engaged by fluid pressure and the brake is engaged when the tube 86 is connected to the vacuum. Further, only minor modifications are required to place a seal similar to the bellows 82 between the bearing cup 41 and the brake ring 27 and introduce fluid pressure through suitable valve means on the right of the diaphragm 38, as viewed in Fig. 2, whereby both the clutch and the brake can be engaged and released by fluid pressure means. Obviously, the actuating lever 63 and the brake springs 72 and 73 can be eliminated in the above construction.

The second embodiment of my invention, shown in Figs. 3 and 4, is similar in general construction to the embodiment shown in Figs. 1–2 inclusive and the same numerals have been used to identify similar parts. The primary difference between the first embodiment and this second embodiment is in the fluid control mechanism which is particularly adapted for hydraulic operation. A flanged support cap 88 is fastened to the backing ring 89 by screws 90 which pass through the flange of the cap 88. A hydraulic cylinder 91 is fastened securely in a central opening in the cap 88. A piston 92 and packing washer 93 are disposed within the cylinder 91 and are fastened to the control cap 94 by a screw 95 and a washer 96. Fluid is introduced into the cylinder 91 through a tube 97 fastened to the end of the cylinder 91. Pressure can be applied to fluid in the tube 97 and cylinder 91 by a master cylinder 98 fastened to the tube 97. The master cylinder 98 comprises a piston 99 fitted in a cylinder body 100 and pivotally fastened to a lever 101 which is pivoted to the master cylinder body 100. Four brake spring assemblies 102 are equally spaced around the cylinder 91 and normally hold the brake surfaces engaged. The spring assemblies each comprise a stud 103 which is threaded onto the end of a bolt 104 extending through the bearing cup 105, diaphragm 28 and rings 43 and 49. The studs 103 and bolts 104 clamp the bearing support cup assembly 106 firmly together. Each stud 103 protrudes through a clearance hole 107 in the support cap 88 and is surrounded by a coil spring 108 having one end resting on the support cap 88 and the other end engaging a washer 109 adjustably held on the stud 103 by a nut 110.

The operation of this embodiment is similar to the operation of the first embodiment. Assuming that the lever 101 and the piston 99 are raised as shown in Fig. 6, and the cylinders 91 and 100 and tube 97 are full of liquid, the springs 108 hold the cup assembly 106 and driven shaft 22 as shown in Fig. 5, with the brake facing 60 in engagement with the brake surface 61. When a force is applied to the lever 101 to urge the piston 99 downwardly, the force is transmitted through the fluid to the cylinder 91 to urge the piston 92 to the left, as shown in Fig. 6 to engage the clutch facing 59 with the clutch surface 62. Upon release of the force from the lever 101, the springs 108 cause the clutch to disengage and the brake to engage.

Having thus described the nature of the invention, what I claim herein is:

1. A unitary electric power transmitter comprising a frame, an electric motor stator and an electric motor rotor carried by said frame, a rotatable driven shaft carried by said frame and axially movable relatively thereto, a clutch face on said rotor, a brake member carried by said frame, a clutch-brake disc fastened to said driven shaft, said disc being disposed between said clutch face and said brake member and adapted to be engageable with said clutch-face and said brake member, an expansible chamber fluid motor having a movable wall, means securing said expansible chamber fluid motor to said transmitter frame, means operatively connecting said movable chamber wall to said driven shaft for moving said shaft axially in one direction, spring means operatively connected to said driven shaft for moving said driven shaft axially in the opposite direction, means for supplying fluid to said expansible chamber, and treadle operated means for developing the pressure applied to said fluid.

2. A unitary electric power transmitter comprising a frame, an electric motor stator and an electric motor rotor carried by said frame, a rotatable driven shaft carried by said frame and axially movable relatively thereto, a clutch face on said rotor, a brake member carried by said frame, a clutch-brake disc fastened to said driven shaft, said disc being disposed between said clutch face and said brake member and adapted to be engageable with said clutch-face and said brake member, a fluid pressure cylinder carried by said transmitter frame, a piston disposed within said cylinder for reciprocation, means operatively connecting said piston to said driven shaft for causing said shaft to move axially upon reciprocation of said piston, fluid pressure means for moving said piston, a master cylinder having a movable piston for applying pressure to said fluid pressure means, and operator actuated means for moving said piston in said master cylinder.

3. A unitary electric power transmitter comprising a frame, an electric motor stator and an electric motor rotor carried by said frame, a driven shaft, bearing means carried by said frame for rotatably supporting said driven shaft, said bearing means being movable axially relatively to said frame and fixed against axial movement relative to said driven shaft, a clutch face on said rotor, a brake member carried by said frame, a clutch-brake disc disposed between said clutch face and said brake member, said disc being fastened to said driven shaft and adapted to engage said clutch face and said brake member, an expansible chamber fluid motor having a movable wall, means securing said expansible chamber fluid motor to said transmitter frame, means operatively connecting said movable chamber wall to said bearing means for moving said bearing means axially in response to movement of said movable wall, fluid pressure means for moving said wall, a master cylinder having a movable piston for applying pressure to said fluid pressure means, and operator actuated means for developing the pressure for moving said piston in said master cylinder.

4. A unitary electric power transmitter comprising a frame, an electric motor stator and an electric motor rotor carried by said frame, a driven shaft, bearing means carried by said frame for rotatably supporting said driven shaft, said bearing means being movable axially relatively to said frame and fixed against axial movement relatively to said driven shaft, a clutch face on said rotor, a brake member carried by said frame, a clutch-brake disc disposed between said clutch face and said brake member, said disc being fastened to said driven shaft and adapted to engage said clutch face and said brake member, an actuating lever pivotally carried by said transmitter frame, means operatively connecting said lever to said bearing means for axial movement of said bearing support when said lever moves about its pivot, an expansible chamber fluid motor having a movable wall, means securing said expansible chamber fluid motor to said transmitter frame, means operatively connecting said movable chamber wall to said lever and said bearing means for moving said lever about its pivot and said bearing means axially in response to movement of said movable wall, a fluid pressure means for moving said wall, and manually actuated means provided for developing the pressure in said fluid pressure means.

5. A unitary electric power transmitter comprising a frame, an electric motor stator and an electric motor rotor carried by said frame, a driven shaft, bearing means carried by said frame for rotatably supporting said driven shaft, said bearing means being movable axially relatively to said frame and fixed against axial movement relatively to said driven shaft, a clutch face on said rotor, a brake member carried by said frame, a clutch-brake disc disposed between said clutch face and said brake member, said disc being fastened to said driven shaft and adapted to engage said clutch face and said brake member, a hydraulic cylinder carried by said transmitter frame, a movable piston disposed in said cylinder, the longitudinal axis of said piston and cylinder being coaxial with the axis of rotation of said driven shaft, connecting means securing said piston to said bearing means, fluid pressure means for moving said piston and said driven shaft in one direction, means to control the pressure of said fluid pressure control means, and spring means for moving said driven shaft in a direction opposite to said one direction.

References Cited in the file of this patent

UNITED STATES PATENTS

| | | |
|---|---|---|
| 2,039,128 | Tiedeman | Apr. 28, 1936 |
| 2,510,917 | Turner et al. | June 6, 1950 |
| 2,627,370 | Crum | Feb. 3, 1953 |
| 2,717,967 | Turner | Sept. 13, 1955 |

FOREIGN PATENTS

| | | |
|---|---|---|
| 712,690 | Germany | Oct. 31, 1941 |